(12) United States Patent
Mazzalai (10) Patent No.: US 12,012,712 B2
(45) Date of Patent: Jun. 18, 2024

(54) SPILLWAY WATER SYSTEM

(71) Applicant: SWS ENGINEERING S.p.A., Trento-Frazione Mattarello (IT)

(72) Inventor: Paolo Mazzalai, Trento-Frazione Mattarello (IT)

(73) Assignee: SWS ENGINEERING S.P.A., Trento-Frazione Mattarello (IT)

( * ) Notice: Subject to any disclaimer, the term of this patent is extended or adjusted under 35 U.S.C. 154(b) by 256 days.

(21) Appl. No.: 17/282,827

(22) PCT Filed: Oct. 11, 2019

(86) PCT No.: PCT/IB2019/058682
§ 371 (c)(1),
(2) Date: Apr. 5, 2021

(87) PCT Pub. No.: WO2020/075127
PCT Pub. Date: Apr. 16, 2020

(65) Prior Publication Data
US 2021/0372067 A1 Dec. 2, 2021

(30) Foreign Application Priority Data

Oct. 12, 2018 (IT) .......................... 102018000009417

(51) Int. Cl.
*E02B 3/02* (2006.01)
*E02B 7/20* (2006.01)
(Continued)

(52) U.S. Cl.
CPC ................ *E02B 7/205* (2013.01); *E02B 8/06* (2013.01); *E02B 8/08* (2013.01); *E02B 9/02* (2013.01)

(58) Field of Classification Search
CPC ... E02B 1/006; E02B 3/02; E02B 8/06; E02B 8/08; E02B 8/085; E02B 7/20–48
See application file for complete search history.

(56) References Cited

U.S. PATENT DOCUMENTS 799,830 A * 9/1905 Church ..................... E02B 8/06
405/108
821,037 A * 5/1906 Hennebique .............. E02B 8/06
405/111
(Continued)

FOREIGN PATENT DOCUMENTS

| DE | 31 46 523 A1 | 6/1983 |
| FR | 2 585 146 A3 | 1/1987 |
| JP | H06 272232 A | 9/1994 |

*Primary Examiner* — Edwin J Toledo-Duran
(74) *Attorney, Agent, or Firm* — ASLAN LAW, P.C.

(57) ABSTRACT

A spillway water system comprising at least one adjustable barrier sluice gate of one watercourse and defining: one upstream stretch and one downstream stretch of the watercourse arranged upstream and downstream of the sluice gate respectively; one spillway point arranged at a spillway height and at which a spillway water flow rate skims which flows from the upstream stretch and flows into the downstream stretch; the sluice gate comprising adjustment device/unit adapted to raise or lower the spillway height; a first measurement device/unit for measuring the level of water flowing along the downstream stretch; a second measurement device/unit for measuring the level of water of the upstream stretch; and a command device/unit of the adjustment device/unit operatively connected to the first and to the second measurement device/unit and configured to raise or lower the spillway height depending on the level measured by the first and the second measurement device/unit.

16 Claims, 4 Drawing Sheets

(51) Int. Cl.
  *E02B 8/06*   (2006.01)
  *E02B 8/08*   (2006.01)
  *E02B 9/02*   (2006.01)

(56) References Cited

U.S. PATENT DOCUMENTS

| | | | | |
|---|---|---|---|---|
| 974,315 A * | 11/1910 | Vancil | ............... | E02B 8/06 |
| | | | | 405/108 |
| 1,249,227 A * | 12/1917 | Smith | ............... | E02B 8/06 |
| | | | | 405/108 |
| 1,561,796 A * | 11/1925 | Rehbock | ............... | E02B 8/06 |
| | | | | 405/108 |
| 2,080,045 A * | 5/1937 | Hornsby | ............... | E02B 8/06 |
| | | | | 405/78 |
| 2,118,535 A * | 5/1938 | Betts | ............... | E02B 7/205 |
| | | | | 405/101 |
| 2,163,102 A * | 6/1939 | Odill | ............... | F03B 13/08 |
| | | | | 405/99 |
| 3,495,411 A * | 2/1970 | Clemens | ............... | E02B 7/205 |
| | | | | 405/96 |
| 4,199,274 A * | 4/1980 | Loth | ............... | G01F 1/002 |
| | | | | 405/80 |
| 4,229,119 A * | 10/1980 | Borca | ............... | E02B 7/005 |
| | | | | 405/91 |
| 4,352,593 A * | 10/1982 | Iskra | ............... | E02B 8/06 |
| | | | | 405/80 |
| 4,368,121 A * | 1/1983 | Vasiliev | ............... | E02B 8/06 |
| | | | | 405/80 |
| 4,437,431 A * | 3/1984 | Koch | ............... | E02B 8/085 |
| | | | | 405/83 |
| 5,032,038 A * | 7/1991 | Lemperiere | ............... | E02B 8/06 |
| | | | | 405/114 |
| 5,061,118 A * | 10/1991 | Lemperiere | ............... | E02B 7/16 |
| | | | | 405/114 |
| 5,195,846 A * | 3/1993 | Lemperiere | ............... | E02B 7/16 |
| | | | | 405/114 |
| 5,538,360 A * | 7/1996 | Obermeyer | ............... | E02B 7/44 |
| | | | | 405/91 |
| 5,613,803 A * | 3/1997 | Parrish | ............... | E02B 7/205 |
| | | | | 405/80 |
| 5,882,144 A * | 3/1999 | Lemperiere | ............... | E02B 7/16 |
| | | | | 405/80 |
| 6,171,023 B1 * | 1/2001 | Townshend | ............... | E02B 7/42 |
| | | | | 405/87 |
| 6,196,764 B1 * | 3/2001 | Bayssiguier | ............... | E02B 7/20 |
| | | | | 405/102 |
| 6,755,591 B1 * | 6/2004 | Rees | ............... | E02B 8/06 |
| | | | | 405/87 |
| 8,074,670 B2 * | 12/2011 | Peters | ............... | E03F 5/103 |
| | | | | 405/80 |
| 8,591,149 B2 * | 11/2013 | Lacroix | ............... | E02B 8/06 |
| | | | | 405/92 |
| 8,876,431 B1 * | 11/2014 | Becker | ............... | E02B 7/54 |
| | | | | 405/111 |
| 2003/0072617 A1 * | 4/2003 | Burns, II | ............... | E02B 1/003 |
| | | | | 405/83 |
| 2003/0143027 A1 * | 7/2003 | Obermeyer | ............... | E02B 5/082 |
| | | | | 405/91 |
| 2005/0129463 A1 * | 6/2005 | Craig | ............... | E02B 13/02 |
| | | | | 405/87 |
| 2008/0038063 A1 * | 2/2008 | McCreedy | ............... | E02B 7/16 |
| | | | | 405/92 |
| 2009/0110485 A1 * | 4/2009 | Cripps | ............... | E02B 9/00 |
| | | | | 405/75 |
| 2009/0269139 A1 * | 10/2009 | McBride | ............... | F15D 1/02 |
| | | | | 405/80 |
| 2011/0006530 A1 * | 1/2011 | Van Blerk | ............... | E03B 7/07 |
| | | | | 290/52 |
| 2013/0045051 A1 * | 2/2013 | Aughton | ............... | E02B 7/28 |
| | | | | 405/87 |
| 2014/0251478 A1 * | 9/2014 | Dolezilek | ............... | G05D 7/067 |
| | | | | 137/861 |
| 2015/0267369 A1 * | 9/2015 | Kagiannas | ............... | E02B 3/10 |
| | | | | 405/108 |
| 2017/0298585 A1 * | 10/2017 | Carey | ............... | A01K 79/02 |
| 2019/0390427 A1 * | 12/2019 | Del Rey | ............... | E02B 7/16 |
| 2022/0195978 A1 * | 6/2022 | Heald | ............... | H02K 7/1823 |

* cited by examiner

SPILLWAY WATER SYSTEM

CROSS-REFERENCE TO RELATED APPLICATIONS

This application claims priority to IT Patent Application No. 102018000009417 filed on Oct. 12, 2018, and this application claims priority to and is a 371 of international PCT Application No. PCT/IB2019/058682 filed on Oct. 11, 2019, the entire contents of which are hereby incorporated by reference.

TECHNICAL FIELD

The present invention relates to a spillway water system.

BACKGROUND ART

Several spillway water systems are known to be used to adjust the flow rate of a watercourse in compliance with certain hydrological parameters generally established by law.

Specifically, the water systems of known type comprise one or more sluice gates provided with at least one barrage positioned along the watercourse, the purpose of which is to split the watercourse into an upstream stretch and a downstream stretch in relation to the position of the sluice gate itself.

This way, the barrage defines a spillway point positioned at a spillway height of a predefined value and at which point, a part of the water flowing along the upstream stretch flows into the downstream stretch, skimming the top of the barrage.

Moreover, very frequently, these water systems comprise one or more turbines for the production of hydroelectric energy arranged along a bypass stretch that branches off from the upstream stretch of the watercourse to rejoin the latter at the downstream stretch.

In fact, the sluice gate defines a difference in level along the watercourse that allows conveying part of the water flowing along the upstream stretch towards the bypass stretch where the turbines are installed.

In addition, the majority of watercourses along which these types of water systems are installed must have, by law, at least one outflow stretch that connects the upstream stretch to the downstream stretch of the watercourse and that must be freely accessible to the species that populate the watercourse, so as to reduce the environmental impact of the system, in this case the sluice gates, on the local ecosystem.

In fact, it is easy to appreciate that these species, although they can easily cross the sluice gate swimming in the streamflow that skims the top of the barrage from the upstream stretch to the downstream stretch, are not always able to do the same in the opposite direction.

Generally speaking, the water systems of known type comprise at least one level sensor located along the downstream stretch and used to adjust the flow rate of the latter according to the design and legal constraints that the water system has to comply with.

In particular, the flow is adjusted by adjusting the spillway height of the sluice gates.

In fact, the sluice gates generally used are of the adjustable type, i.e. the height of the barrage can be adjusted in a motor-driven manner, varying the flow rate of water that skims the top of the sluice gate from the upstream stretch to flow into the downstream stretch.

This way, depending on the level of water measured at the downstream stretch, it is possible to adjust the height of the sluice gate so as to maintain the flow rate of the downstream stretch at a predefined flow rate value according to the design and legal constraints that the water system has to comply with.

This type of water systems does however have some drawbacks linked to the parameters taken into account in order to adjust the spillway height.

In fact, the presence of the sluice gate also affects significantly the flow rate of the upstream stretch.

In particular, the sluice gate prevents the upstream stretch from undergoing the characteristic flow rate variations of the natural cycle of ecosystem, such as e.g. flow rate variations caused by the succession of seasons.

As a result, the natural life cycle of the species living in or around the watercourse is significantly altered, with particularly serious consequences on the local ecosystem.

DESCRIPTION OF THE INVENTION

The main aim of the present invention is to devise a spillway water system that allows significantly reducing the environmental impact of the system itself with respect to known systems.

Another object of the present invention is to devise a spillway water system that allows overcoming the aforementioned drawbacks of the prior art in a simple, rational, easy, effective to use and affordable solution.

The aforementioned objects are achieved by the present spillway water system having the characteristics of claim 1 and by the method of control of spillway water systems having the characteristics of claim 12.

BRIEF DESCRIPTION OF THE DRAWINGS

Other characteristics and advantages of the present invention will be more evident from the description of some preferred, but not exclusive, embodiments of a spillway water system and a method of control of spillway water systems, illustrated as an indication, but not limited thereto, in the annexed tables of drawings in which.

EMBODIMENTS OF THE INVENTION

With particular reference to these figures, reference numeral 1 globally indicates a method of control of spillway water systems.

Figure 1:
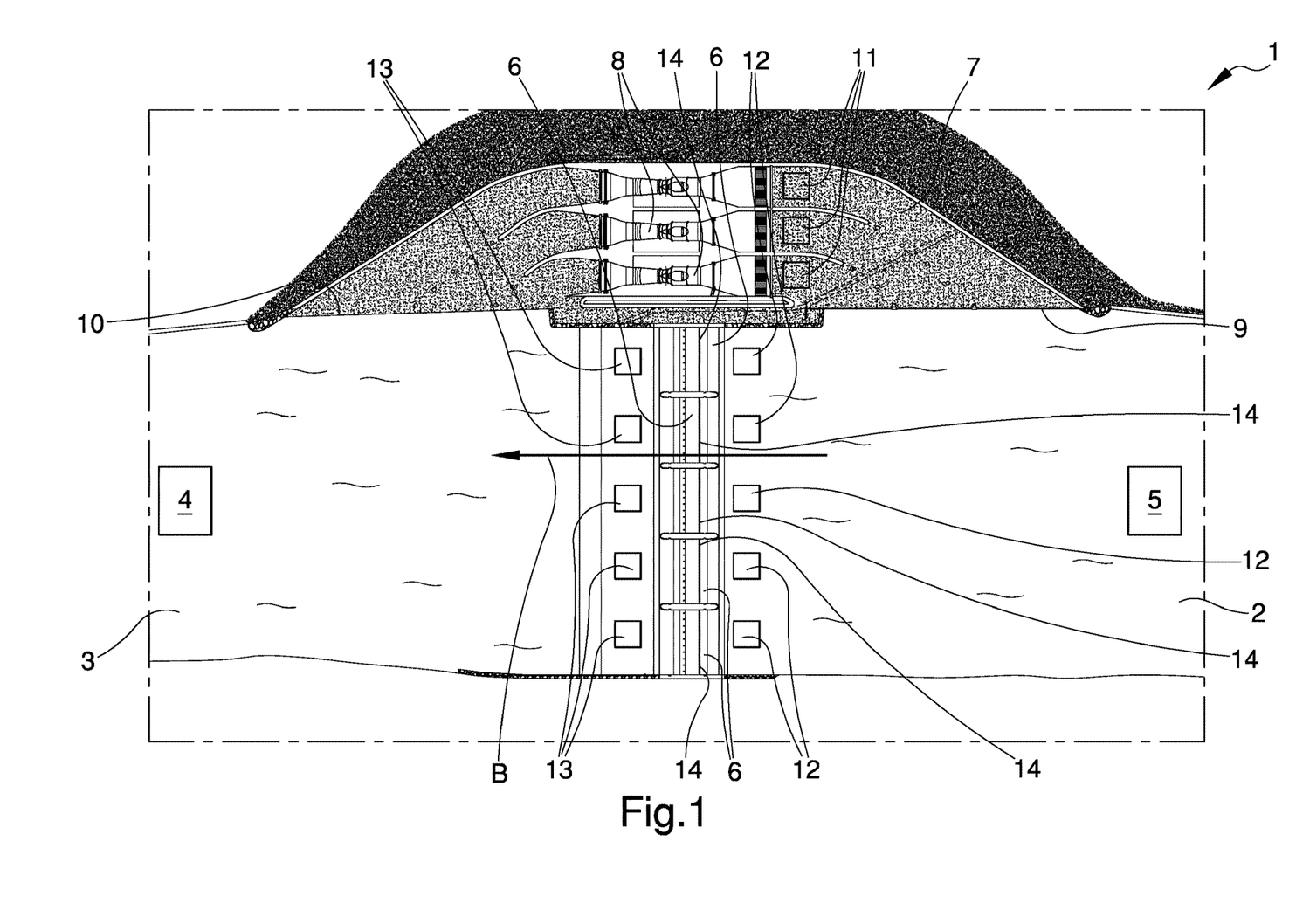
FIG. 1 is a schematic view of an embodiment of the spillway water system according to the invention.

The spillway water system 1 comprises:
- at least one adjustable barrage sluice gate 6 of at least one watercourse and defining:
  - at least one upstream stretch 2 and at least one downstream stretch 3 of the watercourse arranged upstream and downstream of the sluice gate itself respectively;
  - at least one spillway point 14 arranged at a spillway height H and at which a spillway water flow rate skims which flows from the upstream stretch 2 and flows into the downstream stretch 3;

the sluice gate 6 comprising adjustment means for adjusting the spillway height H, the adjustment means being adapted to raise or lower the spillway height H;

first measurement means 4 for measuring the level of water flowing along the downstream stretch 3;

second measurement means 5 for measuring the level of water of the upstream stretch 2;

command means of the adjustment means operatively connected to the first and to the second measurement means 4, 5 and configured to raise or lower the spillway height H depending on the level measured by the first and the second measurement means 4, 5.

In the following discussion, in order to make the description clear, the value measured of the water level along the upstream stretch 2 is indicated by the letter I.

In particular, in the present discussion, it is assumed that the water flowing along the watercourse naturally flows from the upstream stretch 2 to the downstream stretch 3 along a direction of flow B.

Preferably, the sluice gates 6 are of the fan type.

Alternative embodiments of the system 1 wherein the sluice gates 6 are of different types, such as spillway gates, sector gates or the like, cannot however be ruled out.

Advantageously, the sluice gate 6 comprises at least a pair of fixed bodies positioned substantially opposite each other and anchored to the bed of the watercourse in such a way as to prevent the current of water flowing along the direction of flow B from moving the sluice gate itself.

In addition, the sluice gate 6 comprises at least one movable barrage, the ends of which are associated with the pair of fixed bodies respectively by interposition of the adjustment means, so as to arrange the barrage substantially transverse to the direction of flow B of the water and at the same time so as to allow the movement thereof with respect to the fixed bodies.

In particular, the adjustment means comprise at least one electro-mechanical motor-driven unit which allows varying the inclination of the barrage with respect to the direction of flow B of the water.

In fact, the barrage is preferably a slab-shaped body provided with a straight profile which extends substantially horizontal between the pair of fixed bodies and defining the spillway point.

According to this type of embodiment, the adjustment means allow tilting the barrage and moving the straight profile closer to or further away from the downstream stretch 3, lowering or raising the height of the spillway point.

Preferably, the system 1 comprises a plurality of sluice gates 6 arranged side by side to form a barrage line that extends substantially transverse to the direction of flow B, crossing the watercourse from one bank to the other.

In a preferred embodiment, the first and second measurement means 4, 5 are of the type of level sensors.

The command means, on the other hand, are of the type of a programmable logic controller (PLC) configured to receive and process certain data, in this case the values of level measured by the first and by the second measurement means 4, 5, and to command the adjustment means according to the data received.

Alternative embodiments of the system 1 cannot however be ruled out wherein the command means are of a different type, such as e.g. a computer.

Advantageously, the command means comprise at least one processing unit for processing a safety level S which unit is configured to calculate the value of the safety level S depending on the level measured by the first and by the second measurement means 4, 5, by increasing or reducing the spillway height H of the spillway point 14 when the value of the level measured by the second measurement means 5 is lower or higher, respectively, than the value of the safety level S, thus maintaining the level of water of the upstream stretch 2 at a value equal to the safety level S.

In particular, the processing unit processes a value of the total flow rate Q of the watercourse depending on the level measurement performed by the first measurement means 4 and processes the value of the safety level S depending on the value of the total flow rate Q of the watercourse.

Preferably, the processing unit is of the type of a microcontroller configured to process an outflow scale depending on the level measurement performed by the first measurement means 4.

More in detail, the outflow scale makes it possible to determine the total flow rate Q of the watercourse under natural conditions, i.e. the conditions of the watercourse if the system 1 were not present.

In addition, being known the total flow rate Q, the processing unit calculates the level of water that would flow along the upstream stretch 2 under natural conditions, i.e. the value of the safety level S.

In addition, the command means periodically compare the calculated safety level S with the value of the level I measured by the second measurement means 5, i.e. with the water level of the upstream stretch 2, and operate the adjustment means in such a way as to maintain the water level I at approximately the same level as the calculated safety level S.

In particular, the command means process a command signal which is sent to the adjustment means and indicates to the latter the type of adjustment to be carried out, i.e., if the level of the upstream stretch 2 is higher than the safety level S, the command signal indicates to the adjustment means to tilt the barrage towards the downstream stretch 3, so as to lower the spillway height H. On the other hand, if the level I is lower than the safety level S, the command signal indicates to the adjustment means to straighten the barrage, in order to raise the spillway height H.

In fact, by raising or lowering the spillway height H in this way, the spillway flow rate, which from the upstream stretch 2 flows into the downstream stretch 3, decreases or increases and, consequently, the level of the upstream stretch 2 increases or decreases.

In other words, this type of adjustment allows periodically adjusting the water level along the upstream stretch 2.

Preferably, the command means carry out this adjustment operation every either ten or fifteen minutes.

However, the command means are preferably provided with an operator-programmable control timer which is configured to define the time span elapsing between two adjustment operations depending on the characteristics of the system 1 and/or the watercourse.

Advantageously, the system 1 comprises:

at least one adjustable turbine 8 for the production of hydroelectric energy arranged along at least one bypass stretch 7 connected in a fluid-operated manner to the upstream stretch 2 at a branch-off point 9 from the watercourse, and connected in a fluid-operated manner to the downstream stretch 3 at a junction point 10 with the watercourse, the turbine 8 comprising setting means for setting the turbinated water flow rate T which are adapted to increase or reduce the water flow rate that passes through the turbine itself for the production of hydroelectric energy;

third measurement means 11 for measuring the water flow rate turbinated by the turbine 8;

control means for controlling the setting means operatively connected to the third measurement means 11 and configured to increase or reduce the turbinated flow rate T depending on the level measurement performed by the first measurement means 4.

Preferably, the system 1 comprises a plurality of turbines 8 arranged side by side to occupy the bypass stretch 7 transversely.

Preferably, the third measurement means 11 are flow rate sensors of known type located in the proximity of the turbines 8 so as to periodically measure the flow rate T turbinated by the turbines themselves.

In particular, the third measurement means 11 preferably comprise a flow rate sensor installed at each turbine.

This way, the turbinated flow rate T of each turbine 8 can be monitored and adjusted.

In addition, the setting means are preferably speed regulators of known type adapted to adjust the rotation speed of the turbines.

Appropriately, the first measurement means 4 are arranged along the watercourse at a measuring point arranged downstream of the junction point 10 of the bypass stretch 7 with the downstream stretch 3.

This way, the processing unit calculates the total flow rate Q correctly, i.e. it also takes into account the flow rate of water flowing along the bypass stretch 7. In fact, if the first measurement means 4 were not positioned downstream of the junction point 10, they would not measure the flow rate of water flowing along the bypass stretch 7, but only that flowing along the upstream stretch 2 and which is located downstream of the branch-off point 9.

Advantageously, the control means coincide with the command means.

Alternative embodiments of the system 1 cannot however be ruled out wherein the control means are, e.g., of the type of a PLC different from the command means.

In particular, the control means are configured to:
reduce the value of the turbinated flow rate T when the value of the total flow rate Q is substantially different from the value of the turbinated flow rate T added to a release flow rate R having a default value, and the value of the total flow rate Q is greater than the value of the turbinated flow rate T added to a minimum release flow rate N having a default value;
increase the value of the turbinated flow rate T when the value of the total flow rate Q is substantially different from the value of the turbinated flow rate T added to the value of the release flow rate R, the value of the total flow rate Q is greater than the value of the turbinated flow rate T added to the value of the minimum release flow rate N, and the value of the turbinated flow rate T is lower than a value of maximum turbinable flow rate M having a default value.

In the following discussion, the term minimum release flow rate N is used to indicate the minimum flow rate value that must always skim the top of the sluice gates 6 from the upstream stretch 2 to the downstream stretch 3.

The term maximum turbinable flow rate M, on the other hand, is used to indicate the maximum flow rate value that can be turbinated by the turbines 8 and that is required by law or as a design parameter of the system 1.

In particular, the control means make it possible to keep the turbinated flow rate T of the turbines 8 below the maximum turbinable flow rate M and at the same time to adjust the flow rate thereof so as to maintain the level I substantially equal to the safety level S and to maintain the value of the spillway flow rate substantially always above the value of minimum release flow rate N.

In fact, the command means are configured to lower the spillway height H when:
the value of the total flow rate Q is greater than the value of the turbinated flow rate T added to the value of minimum release flow rate N; and
the value of the turbinated flow rate T is substantially equal to the value of the maximum turbinable flow rate M.

Furthermore, the system 1 comprises:
fourth measurement means 12 for measuring the spillway level of water from the upstream stretch 2 to the downstream stretch 3 which are arranged along the upstream stretch 2 at the spillway point 14;
calculation means configured to calculate the value of the spillway flow rate depending on the level measurement performed by the fourth measurement means 12.

Preferably, the fourth measurement means 12 are of the type of a level sensor located in the proximity of the spillway point 14 defined by sluice gate 6.

In addition, the measurement means 12 preferably comprise a level sensor installed in the proximity of each sluice gate 6.

This way, it is possible to monitor and adjust the water level at each sluice gate 6.

The calculation means, instead, preferably coincide with the processing unit. Alternative embodiments of the system 1 cannot however be ruled out wherein the calculation means are of the type of a microcontroller different from the processing unit.

In particular, the value of the release flow rate R coincides with the value of the spillway flow rate.

Furthermore, the system 1 comprises:
detection means for detecting the spillway height H of the spillway point 14 arranged in the proximity of the sluice gate 6;
activation means for activating the adjustment means of the sluice gate 6 configured to raise or lower the spillway height H respectively, when the detection means 13 detect a value of the spillway height H lower or higher than an expected spillway height A having a default value, maintaining the value of the spillway height H substantially equal to the value of the expected spillway height A.

Conveniently, the detection means 13 comprise a detection sensor installed in the proximity of each sluice gate 6.

This way, the spillway height H at each sluice gate 6 can be monitored and adjusted.

The activation means, on the other hand, preferably coincide with the command means and with the control means.

Alternative embodiments of the system 1 cannot however be ruled out wherein the activation means are, e.g., of the type of a PLC different from at least one of either the command means or the control means.

In particular, the activation means make it possible to verify precisely the spillway height H and to adjust the position of the sluice gate 6, in this case of the barrage, with the purpose of maintaining the value of the spillway height H substantially equal to the value of the expected spillway height A.

Figure 2:
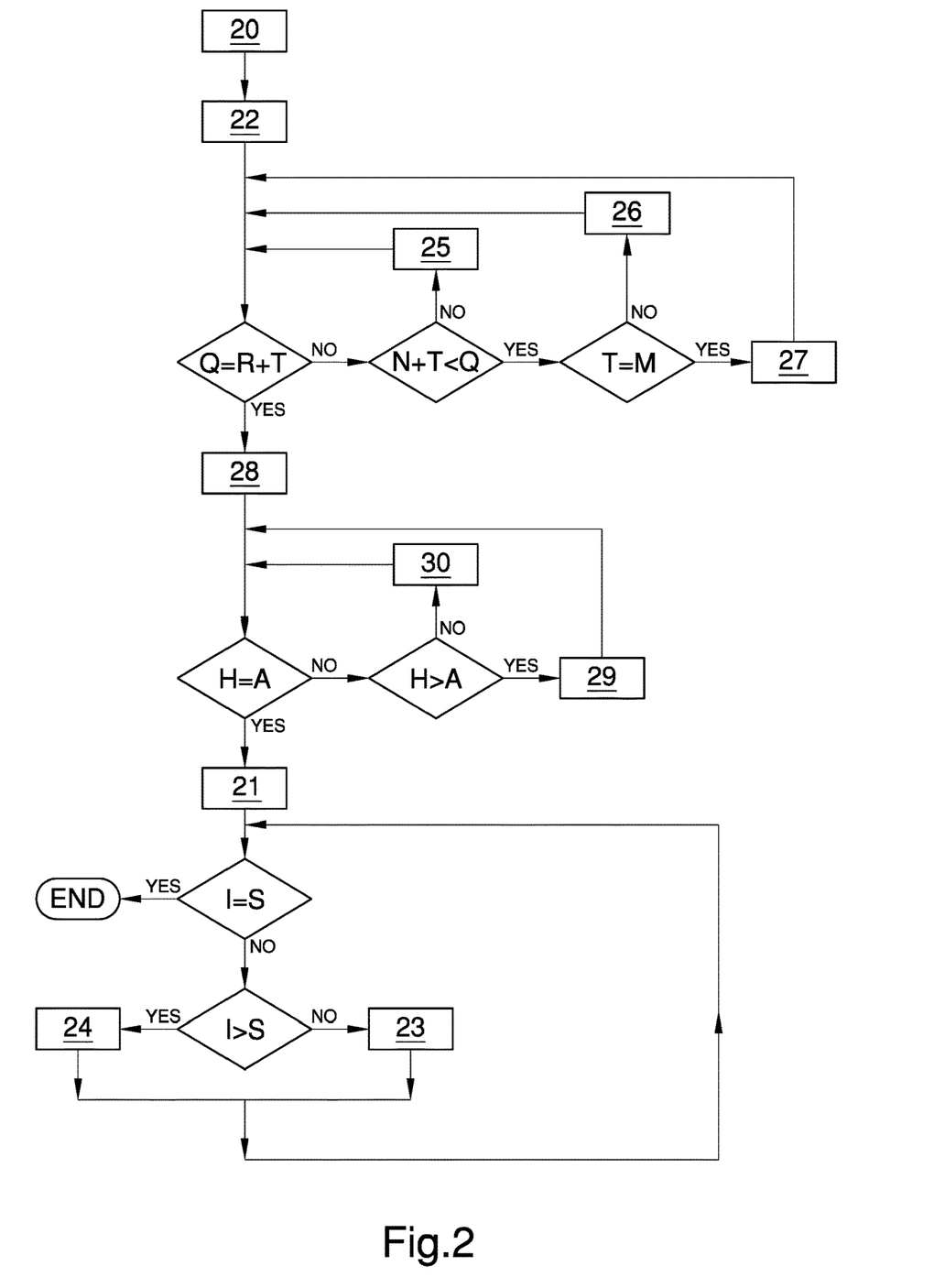
FIG. 2 is a schematic view of an embodiment of the method of control of the spillway water systems according to the invention.

The operation of the system 1 according to the embodiment just described and according to the execution of the method of control of spillway water systems according to the invention is shown in FIG. 2 and is as follows.

The method of control of spillway water systems comprises at least the steps of:
- measurement 20 of the level of water flowing inside a downstream stretch 3 of a watercourse;
- measurement 21 of the level of water flowing inside at least one upstream stretch 2 of the watercourse;
- adjustment of the spillway height H of a spillway point 14 defined by at least one adjustable sluice gate 6 of the watercourse and at which the watercourse skims a flow rate of water flowing from the upstream stretch 2 to the downstream stretch 3, this adjustment being performed depending on the measurement 20 of the level of water flowing along the downstream stretch 3 and on the measurement 21 of the level of water flowing along the upstream stretch 2.

In particular, the adjustment of the spillway height H comprises at least the steps of:
- processing 22 of a safety level S depending on the measurement 20 of the level of water flowing along the downstream stretch 3;
- increase 23 of the spillway height H of the spillway point 14 when the level of water measured along the upstream stretch 2 is lower than the processed safety level S;
- reduction 24 of the spillway height H of the spillway point 14 when the value of the level measured by the second measurement means 5 is higher than the value of the safety level S.

In the following discussion the terms "increase" and "reduction" used with reference to the steps or to the phases of "increase" and "reduction" of the spillway height H indicate a step comprising at least one step of moving the sluice gate 6 which is adapted to increase and decrease respectively the height of the sluice gate itself.

More in detail, the processing 22 of the value of the safety level S comprises at least the steps of:
- calculation of the value of the total flow rate Q of the watercourse depending on the measurement of the level of water flowing along the downstream stretch 3;
- calculation of the value of the safety level S depending on the calculation of the value of the total flow rate Q.

Appropriately, the method of control of spillway water systems comprises at least one step of setting the value of the turbinated flow rate T by at least one turbine 8 adjustable for the production of hydroelectric energy, which is arranged along at least one bypass stretch 7 connected in a fluid-operated manner to the upstream stretch 2 at a branch-off point 9 from the watercourse, and connected in a fluid-operated manner to the downstream stretch 3 at a junction point 10 with the watercourse, the setting comprising at least the steps of:
- measurement of the turbinated flow rate T by the turbine 8;
- reduction 25 of the value of the turbinated flow rate T when the calculated value of the total flow rate Q is substantially different from the measured value of the turbinated flow rate T added to a release flow rate R having a default value, and the measured value of the total flow rate Q is greater than the measured value of the turbinated flow rate T added to a minimum release flow rate N having a default value;
- increase 26 of the value of the turbinated flow rate T when the calculated value of the total flow rate Q is substantially different from the measured value of the turbinated flow rate T added to a release flow rate R having a default value, the calculated value of the total flow rate Q is greater than the measured value of the turbinated flow rate T added to the value of the minimum release flow rate N, and the measured value of the turbinated flow rate T is lower than a maximum turbinable flow rate M having a default value.

The adjustment of the spillway height H comprises at least the steps of:
- reduction 27 of the value of the spillway height H when the calculated value of the total flow rate Q is greater than the measured value of the turbinated flow rate T added to the value of the minimum release flow rate N, and the measured value of the turbinated flow rate T is substantially equal to the value of the maximum turbinable flow rate M.

In particular, the setting of the value of the turbinated flow rate T and the adjustment of the spillway height H allow the value of the release flow rate R and of the turbinated flow rate T to be set according to the design parameters of the system 1, e.g., such as the minimum release flow rate N and the maximum turbinable flow rate M.

Furthermore, the adjustment of the spillway height H comprises at least the steps of:
- measurement 28 of the spillway height H of the spillway point 14;
- reduction 29 of the value of the spillway height H when the value of the measured spillway height H is substantially higher than an expected spillway height A having a default value;
- increase 30 of the value of the spillway height H when the value of the measured spillway height H is substantially lower than the value of the expected spillway height A.

Conveniently, the method of control of spillway water systems comprises at least one computing step for calculating the spillway flow rate which spills from the upstream stretch 2 to the downstream stretch 3 comprising at least the steps of:
- measurement of the level of water which spills from the upstream stretch 2 to the downstream stretch 3;
- calculation of the value of the spillway flow rate depending on the measurement of the level of water which spills from the upstream stretch 2 to the downstream stretch 3.

The value of the release flow rate R coincides with the calculated value of the spillway flow rate.

In addition, these steps and phases are carried out at regular intervals, so as to allow the continuous operation of the system 1 without significantly affecting the natural conditions of the watercourse.

In fact, the method described above allows the system itself to adapt to the conditions of the environment in which it is installed.

Figure 3:
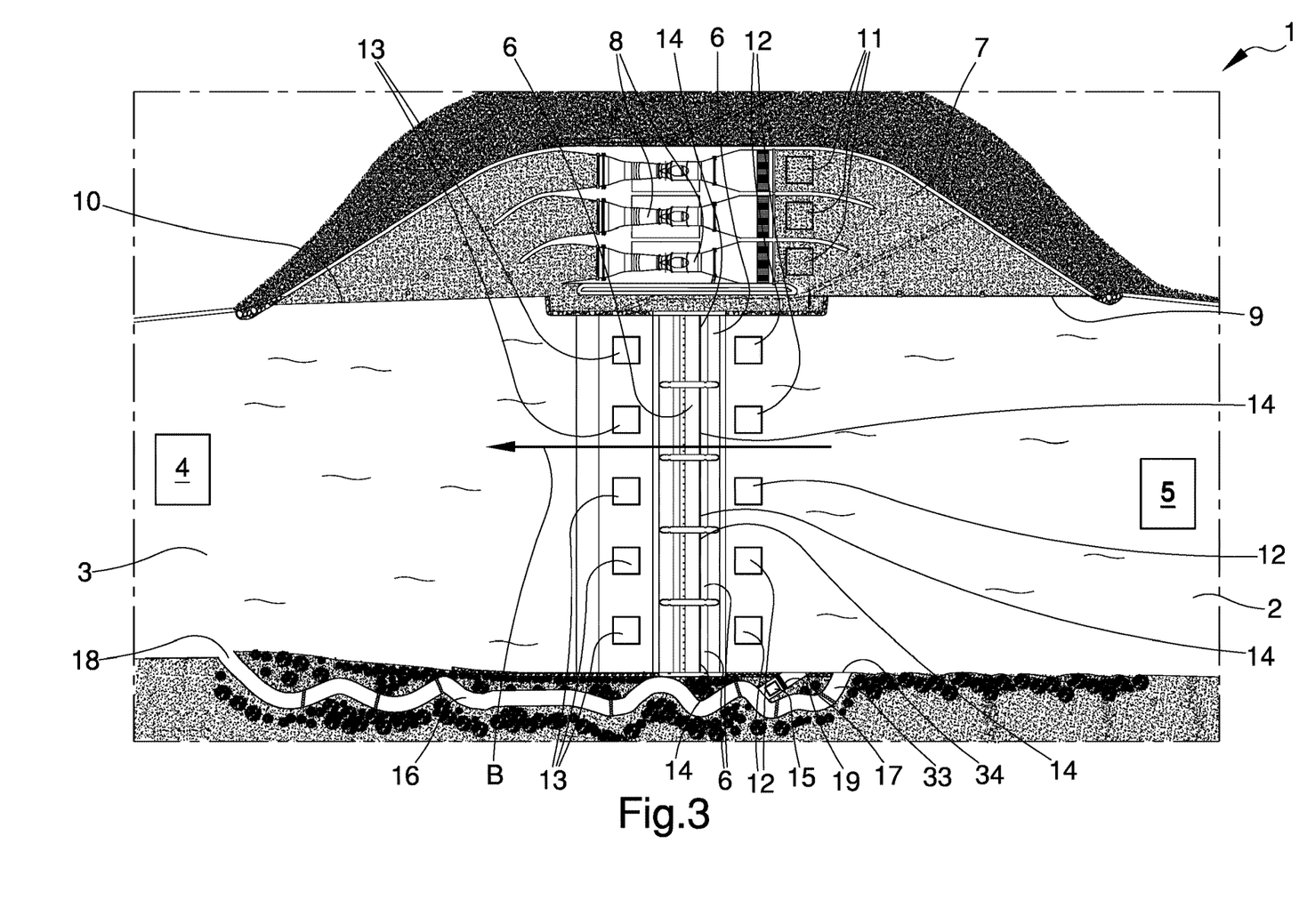
FIG. 3 is a schematic view of an alternative embodiment of the spillway water system according to the invention.

An alternative embodiment of the system 1 is shown in FIG. 3.

In particular, in addition to all components of the embodiment previously described, this embodiment comprises:
- fifth measurement means 15 for measuring the level of water of at least one outflow stretch 16 connected in a fluid-operated manner to the upstream stretch 2 at a partition point 17 from the watercourse and connected in a fluid-operated manner to the downstream stretch 3 at a connection point 18 with the watercourse;
- computing means configured to calculate the value of the outflow rate depending on the level measurement performed by the fifth measurement means 15.

Nevertheless, differently from the embodiment previously described, in this alternative embodiment, the release flow rate R coincides with the value of the spillway flow rate added to the value of the outflow rate of the outflow stretch 16.

In fact, in this embodiment, the system 1 must ensure that along the outflow stretch 16 there is always an outflow rate that allows the species living in the watercourse to pass freely from the downstream stretch 3 to the upstream stretch 2 without passing through the stretch of the watercourse where the sluice gates 6 are located.

In this embodiment, the first measurement means 4 are appropriately arranged along the watercourse at a measuring point located downstream of the junction point 10 of the bypass stretch 7 with the downstream stretch 3 and downstream of the connection point 18 of the outflow stretch 16 with the downstream stretch 3.

Preferably, the fifth measurement means 15 are of the type of a level sensor located along the outflow stretch 16.

The computation means, on the other hand, preferably coincide with the processing unit.

Alternative embodiments of the system 1 cannot however be ruled out wherein the computation means are of the type of a microcontroller different from the processing unit.

Conveniently, the system 1 comprises:
at least one adjustable auxiliary sluice gate 19 arranged along the outflow stretch 16 at the partition point 17 and comprising variation means for varying the height of the auxiliary sluice gate itself, which means are adapted to increase or reduce the height of the latter;
control means for controlling the variation means configured to increase or reduce the height of the auxiliary sluice gate 19 when the value of the level measured by the third measurement means 11 is lower or higher respectively than the value of the safety level S.

According to the embodiment shown in FIG. 3, the system 1 comprises a single auxiliary sluice gate 19 arranged as a barrage of the outflow stretch 16, as described with reference to the sluice gate 6.

Alternative embodiments of the system 1 cannot however be ruled out wherein there is a plurality of auxiliary sluice gates 19, e.g. in a number such as to cover transversely the extension of the outflow stretch 16.

Advantageously, the system 1 also comprises a bifurcation stretch 33 from the outflow stretch 16 and connected in a fluid-operated manner to the upstream stretch 2 at at least one detachment point 34, as shown in FIG. 3.

This way, the bifurcation stretch 33 makes the outflow stretch 16 navigable and allows the species living in the watercourse to freely pass from the downstream stretch 3 to the upstream stretch 2.

In fact, in the absence of the bifurcation stretch 33, the auxiliary sluice gate 19 would prevent the navigation of the outflow stretch 16.

Figure 4:
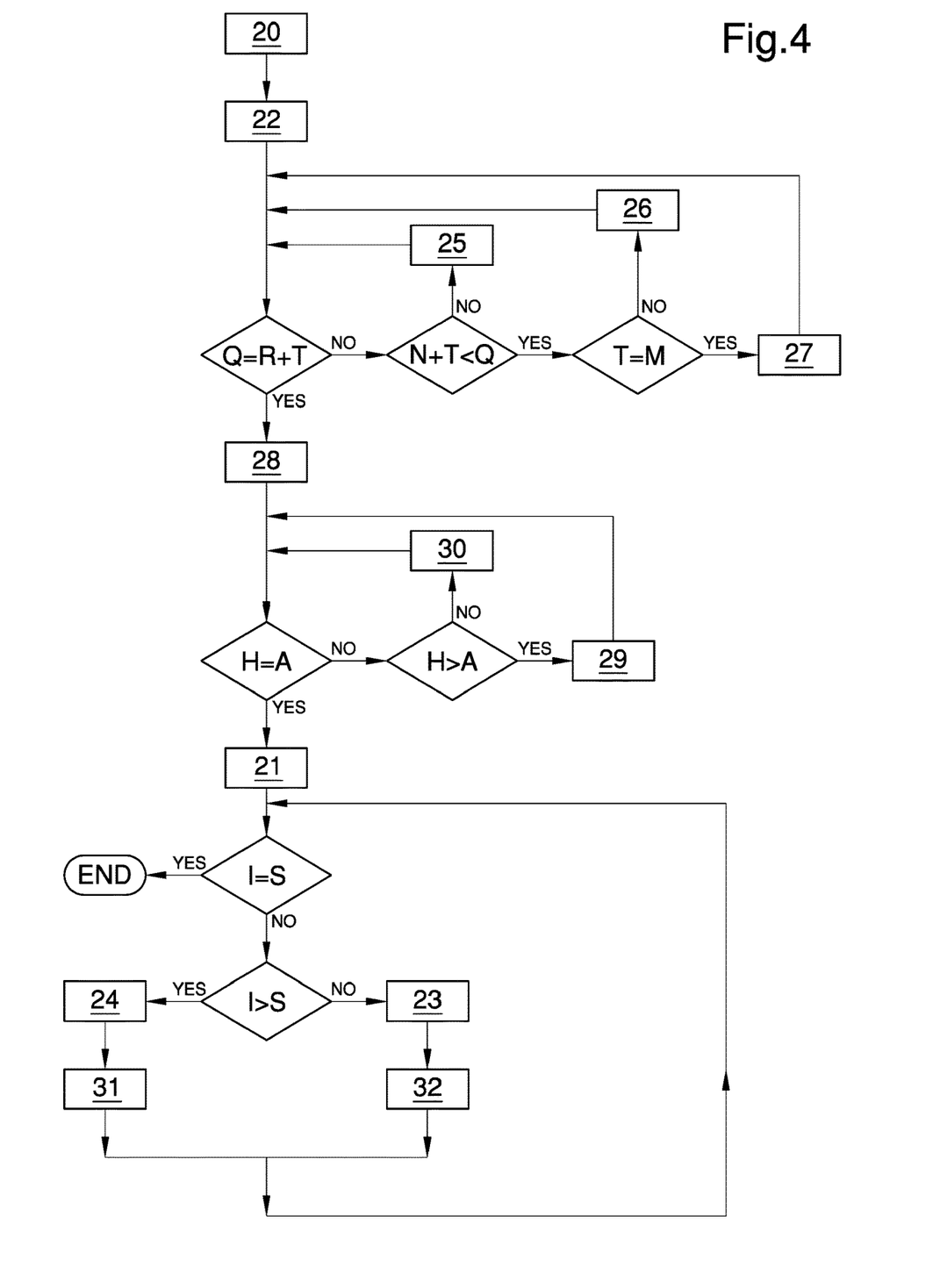
FIG. 4 is a schematic view of an alternative embodiment of the method of control of spillway water systems according to the invention.

The operation of the system 1 according to the embodiment just described and in accordance with the execution of the method of control of spillway water systems according to the invention is shown in FIG. 4 and is as follows.

In particular, with reference to the aforementioned embodiment of system 1, the method of control of spillway water systems comprises at least the steps of:
measurement of the level of water flowing along an outflow stretch 16 connected in a fluid-operated manner to the upstream stretch 2 at a partition point 17 from the watercourse and connected in a fluid-operated manner to the downstream stretch 3 at a connection point 18 with the watercourse;
calculation of the value of the outflow rate of the outflow stretch 16 depending on the measured value of the level of water flowing along the outflow stretch 16;
the release flow rate R coinciding with the calculated value of the spillway flow rate added to the value of the outflow rate.

Conveniently, the method of control of spillway water systems comprises at least one movement step of at least one adjustable auxiliary sluice gate 19 arranged along the outflow stretch 16 at the partition point 17, the movement comprising at least the steps of:
reduction 31 of the height of the auxiliary sluice gate 19 when the measurement of the level of water flowing along the upstream stretch 2 is higher than the value of the safety level S;
increase 32 of the height of the auxiliary sluice gate 19 when the measurement of the level of water flowing along the upstream stretch 2 is lower than the value of the safety level S.

It has in practice been ascertained that the described invention achieves the intended objects.

In particular, the second measurement means and the command means make it possible to precisely adjust the spillway height H of one or more sluice gates according to the level of water measured along the upstream stretch.

In addition, the second measurement means and the command means allow the continuous adjustment of the spillway height of the sluice gates so as to vary the characteristics of the system depending on the conditions of the watercourse, maintaining the level of water of the upstream stretch equal to the safety level.

In addition, the second measurement means and the command means allow controlling the production of hydroelectric energy of one or more turbines and the maintenance of the minimum outflow rate of the outflow channel, considerably limiting the environmental impact of the system on the watercourse compared to the systems of known type.

The invention claimed is:
1. A spillway water system comprising:
at least one adjustable barrier sluice gate of at least one watercourse and defining:
at least one upstream stretch and at least one downstream stretch of said watercourse arranged upstream and downstream of the at least one adjustable barrier sluice gate respectively;
at least one spillway point arranged at a spillway height and at which a spillway water flow rate skims which flows from said at least one upstream stretch and flows into said at least one downstream stretch;
said at least one adjustable barrier sluice gate comprising one or more adjustment devices configured to adjust said spillway height the one or more adjustment devivce(s) being adapted to raise or lower said spillway height;
a first measurement sensor(s) configured to measure the level of water flowing along said at least one downstream stretch;
a second measurement sensor(s) configured to measure the level of water of said at least one upstream stretch; and
one or more controller(s) of said one or more adjustment device(s) operatively connected to said first measurement sensor(s) and to said second measurement sensor(s) and configured to raise or lower said spillway height depending on the level measured by said first measurement sensor(s) and said second measurement sensor(s), wherein said one or more controller(s) comprise at least one processing unit configured to process a safety level configured to calculate the value of said safety level depending on the level measured by said first measurement sensor(s) and said second measurement sensor(s), by increasing or reducing the spillway height of said spillway point when the value of the level measured by said second measurement sensor(s) is lower or higher respectively than the value of said safety level, thus maintaining the level of water of said at least one upstream stretch at a value equal to said safety level, and said processing unit configured to process a value of the total flow rate of said watercourse depending on the level measurement performed by said first measurement sensor(s) and process the value of said safety level depending on the value of said total flow rate of said watercourse.

2. The spillway according to claim 1, further comprising:
at least one adjustable turbine for the production of hydroelectric energy arranged along at least one bypass stretch connected in a fluid-operated manner to said at least one upstream stretch at a branch-off point from said watercourse, and connected in a fluid-operated manner to said at least one downstream stretch at a junction point with said watercourse, said turbine comprising one or more speed regulating device(s) configured to set the turbinated water flow rate which are adapted to increase or reduce the water flow rate that passes through the turbine for the production of hydroelectric energy;
a third measurement sensor(s) configured to measure said water flow rate turbinated by said turbine; and
said one or more controller(s) configured to control said one or more speed regulating device(s) operatively connected to said third measurement sensor(s) and configured to increase or reduce said turbinated flow rate depending on the level measurement performed by said first measurement sensor(s).

3. The spillway according to claim 2, wherein
said one or more controller(s) is configured to:
reduce the value of said turbinated flow rate when the value of said total flow rate is substantially different from the value of said turbinated flow rate added to a release flow rate having a default value, and the value of said total flow rate is greater than the value of said turbinated flow rate added to a minimum release flow rate having a default value; and
increase the value of said turbinated flow rate when the value of said total flow rate is substantially different from the value of said turbinated flow rate added to the value of said release flow rate, the value of said total flow rate is greater than the value of said turbinated flow rate added to the value of said minimum release flow rate, and the value of said turbinated flow rate is lower than a value of maximum turbinable flow rate having a default value.

4. The spillway according to claim 3, wherein
said one or more controller(s) is configured to lower said spillway height when:
the value of said total flow rate is greater than the value of said turbinated flow rate added to the value of said minimum release flow rate; and
the value of said turbinated flow rate is substantially equal to the value of said maximum turbinable flow rate.

5. The spillway according to claim 4, further comprising:
a detection sensor configured to detect the spillway height of said spillway point arranged in the proximity of said at least one adjustable barrier sluice gate; and
said one or more controller(s) configured to activate said one or more adjustment device(s) of said at least one adjustable barrier sluice gate configured to raise or lower said spillway height respectively when said detection sensor detect a value of the spillway height lower or higher than an expected spillway height having a default value, maintaining the value of the spillway height substantially equal to the value of said expected spillway height.

6. The spillway according to claim 5, further comprising:
a fourth measurement sensor(s) configured to measure the spillway level of water from said at least one upstream stretch to said at least one downstream stretch which are arranged along said at least one upstream stretch at said spillway point; and
said one or more controller(s) is configured to calculate the value of said spillway flow rate depending on the level measurement performed by said fourth measurement sensor(s).

7. The spillway according to claim 6, further comprising:
a fifth measurement sensor(s) configured to measure the level of water of at least one outflow stretch connected in a fluid-operated manner to said at least one upstream stretch at a partition point from said watercourse and connected in a fluid-operated manner to said at least one downstream stretch at a connection point with said watercourse;
said one more controller(s) is configured to calculate the value of said outflow rate depending on the level measurement performed by said fifth measurement sensor(s); and
said release flow rate coinciding with the value of said spillway flow rate added to the value of said outflow rate of said outflow stretch.

8. The spillway according to claim 7, further comprising:
at least one adjustable auxiliary sluice gate arranged along said outflow stretch at said partition point and comprising a variation device configured to vary the height of the at least one adjustable auxiliary sluice gate which is adapted to increase or reduce the height of the latter; and
said one or more controller(s) is configured to control said variation device configured to increase or reduce the height of said at least one adjustable auxiliary sluice gate when the value of the level measured by said third measurement sensor(s) is respectively lower or higher than the value of said safety level.

9. A method of control of spillway water systems comprising:
measurement of the level of water flowing along at least one downstream stretch of a watercourse;
measurement of the level of water flowing inside at least one upstream stretch of said watercourse; and
adjustment of the spillway height of a spillway point defined by at least one adjustable sluice gate of said watercourse and at which the watercourse spills a flow rate of water flowing from said at least one upstream stretch to said at least one downstream stretch, said adjustment being performed depending on said measurement of the level of water flowing along said at least one downstream stretch and on said measurement of the level of water flowing along said at least one upstream stretch, wherein said adjustment of the spillway height (H) comprises at least the steps of:

processing of a safety level depending on said measurement of the level of water flowing along said at least one downstream stretch;

increase of the spillway height of said spillway point when the value of said level of water measured along said at least one upstream stretch is lower than said processed safety level; and reduction of the spillway height of said spillway point when the value of said level measured along said at least one downstream stretch is higher than the value of said safety level, wherein said processing of the value of said safety level further comprising:

calculation of the value of the total flow rate of said watercourse depending on the measurement of the level of water flowing along said at least one downstream stretch; and calculation of the values of said safety level depending on the calculation of the value of said total flow rate.

10. The method of control of spillway water systems according to claim 9, further comprising:

at least one step of setting the value of the turbinated flow rate by at least one turbine adjustable for the production of hydroelectric energy, which is arranged along at least one bypass stretch connected in a fluid-operated manner to said at least one upstream stretch at a branch-off point from said watercourse, and connected in a fluid-operated manner to said at least one downstream stretch at a junction point with said watercourse, said setting comprising at least:

measurement of the turbinated flow rate by said turbine;

reduction of the value of said turbinated flow rate when the calculated value of said total flow rate is substantially different from the measured value of said turbinated flow rate added to a release flow rate having a default value, and the measured value of said total flow rate is greater than the measured value of said turbinated flow rate added to a minimum release flow rate having a default value; and increase of the value of said turbinated flow rate when the calculated value of said total flow rate is substantially different from the measured value of said turbinated flow rate added to a release flow rate having a default value, the calculated value of said total flow rate is greater than the measured value of said turbinated flow rate added to the value of said minimum release flow rate, and the measured value of said turbinated flow rate is lower than a maximum turbinable flow rate having a default value.

11. The method of control of spillway water systems according to claim 10, wherein said adjustment of the spillway height comprises at least:

reduction of the value of said spillway height when the calculated value of said total flow rate is greater than the measured value of said turbinated flow rate added to the value of said minimum release flow rate, and the measured value of said turbinated flow rate is substantially equal to the value of said maximum turbinable flow rate.

12. The method of control of spillway water systems according to claim 11, wherein said adjustment of the spillway height comprises at least:

measurement of the spillway height of said spillway point;

reduction of the value of said spillway height when the value of said measured spillway height is substantially higher than an expected spillway height having a default value; and increase of the value of said spillway height when the value of said measured spillway height is substantially lower than the value of said expected spillway height.

13. The method of control of spillway water systems according to claim 12, further comprising:

at least one computing step for calculating the spillway flow rate which spills from said at least one upstream stretch to said at least one downstream stretch comprising at least:

measurement of the level of the water which spills from said at least one upstream stretch to said at least one downstream stretch; and calculation of the value of said spillway flow rate depending on the measurement of the level of water which spills from said at least one upstream stretch to said at least one downstream stretch.

14. The method of control of spillway water systems according to claim 13, wherein the value of said release flow rate coincides with the calculated value of said spillway flow rate.

15. The method of control of spillway water systems according to claim 14, further comprising:

measurement of the level of the water flowing along an outflow stretch connected in a fluid-operated manner to said at least one upstream stretch at a partition point from said watercourse and connected in a fluid-operated manner to said at least one downstream stretch at a connection point with said watercourse; and calculation of the value of the outflow rate of said outflow stretch depending on the measured value of said level of water flowing along said outflow stretch, wherein said release flow rate coinciding with the calculated value of said spillway flow rate added to the calculated value of said outflow rate.

16. The method of control of spillway water systems according to claim 15, further comprising:

at least one movement step of at least one adjustable auxiliary sluice gate arranged along said outflow stretch at said partition point, said movement comprising at least:

reduction of the height of said auxiliary sluice gate when the measurement of the level of water flowing along said at least one upstream stretch is higher than the value of said safety level; and increase of the height of said auxiliary sluice gate when the measurement of the level of water flowing along said at least one upstream stretch is lower than the value of said safety level.

* * * * *